Jan. 22, 1957 J. K. BRIXIUS 2,778,445
FILTER WITH RELIEF VALVE
Filed Oct. 29, 1954 2 Sheets-Sheet 1

INVENTOR.
JACOB K. BRIXIUS
BY
Hyde, Meyer, Baldwin & Doran
ATTORNEYS

Jan. 22, 1957  J. K. BRIXIUS  2,778,445
FILTER WITH RELIEF VALVE
Filed Oct. 29, 1954  2 Sheets-Sheet 2
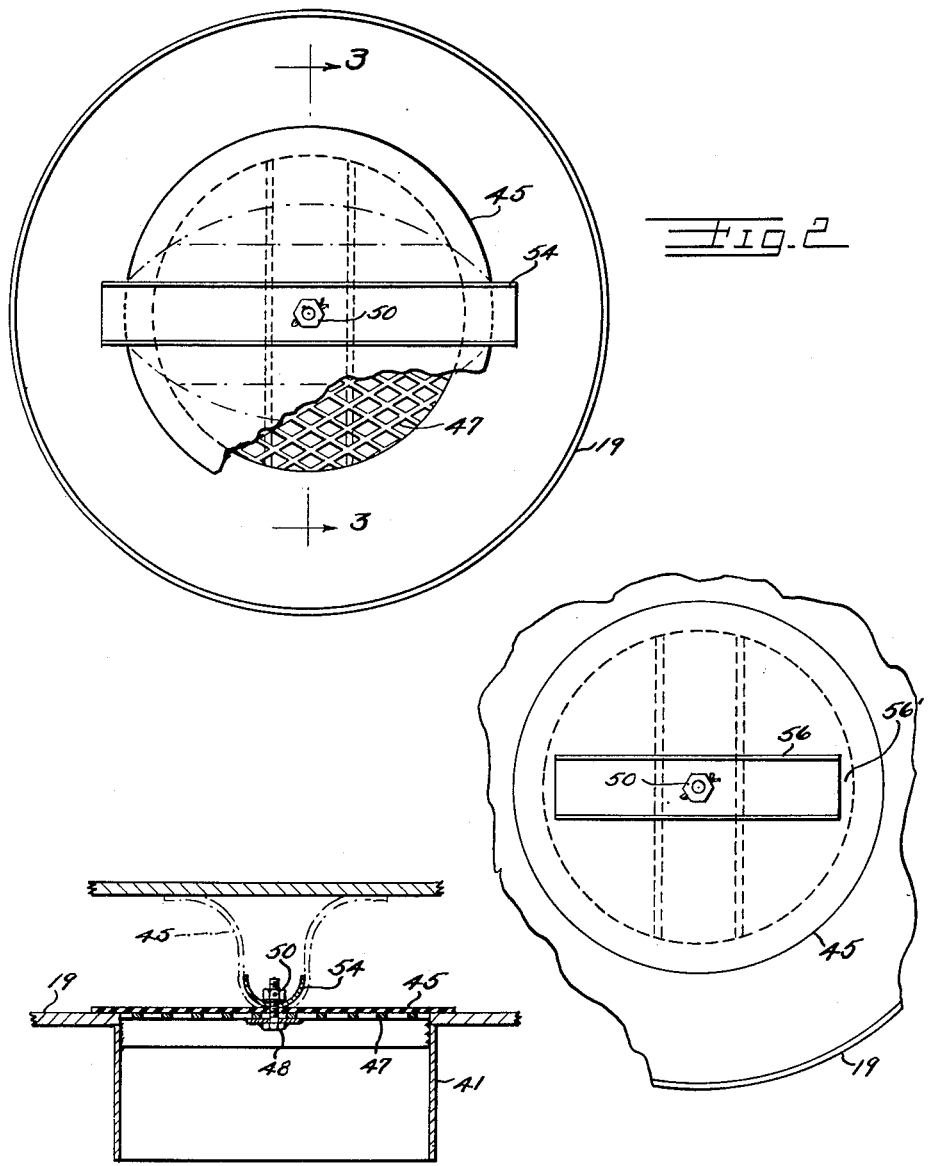
INVENTOR.
JACOB K. BRIXIUS
BY
ATTORNEYS United States Patent Office 2,778,445
Patented Jan. 22, 1957

2,778,445
FILTER WITH RELIEF VALVE

Jacob K. Brixius, Cleveland, Ohio, assignor to Air-Maze Corporation, Cleveland, Ohio, a corporation of Delaware Application October 29, 1954, Serial No. 465,491

3 Claims. (Cl. 183—13)

This invention relates to improvements in a filter for cleaning gas or air, and more particularly, to an improvement in relief valve means for relieving pressures which occur under sudden changes from suction to pressure in such a filter when the flow of the gas stream is reversed.

One of the common applications of the present invention occurs in means for filtering the air stream supplying a compressor or internal combustion engine. Such filters often take the form of a liquid-wash type commonly referred to as an oil bath filter, wherein the oil or other washing liquid operates to keep the filter element clean. The liquid-wash type filter is often applied to the suction pipe of an air compressor of the free-unloading type. When a filter is connected in this manner and the compressor is unloaded (particularly at higher speeds), there is a sudden rush of air under pressure upstream of the inlet pipe and in a reverse direction to the normal flow, which tends to throw the oil or other washing liquid out of the filter at the zone where the air stream normally enters the filter. The loss of such washing liquid results in a subsequent inefficiency of the filter, and generally produces a messy condition around the filter.

An object of this invention, then, is to provide means for venting such sudden reverse flow of air, and for preventing the washing liquid from being blown out of the filter.

Another object of the present invention is to provide a novel valve for the purpose described which will quickly open a large area to permit the reverse flow air stream to egress easily from the filter without having a tendency to blow the liquid out of the filter.

A further object of the present invention is to provide a novel valve for the purpose described which will open and close efficiently thousands of times per minute, without undue strain or wear upon the valve member and one which will be very quiet in operation.

Another object of the present invention is to provide a relief valve for air filters characterized by its structural simplicity, the ease of assembly of its parts, its strong and sturdy nature and its low manufacturing cost. Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 2 is a transverse sectional view taken along the 2—2 of Fig. 1, with parts broken away to more clearly show the construction;

Fig. 3 is a transverse sectional view taken along the plane of line 3—3 of Fig. 2 and showing the valve in various operation positions;

Fig. 4 is a view similar to that of Fig. 2, but showing a modified form of valve fold guide;

A particular difficult condition occurs when filtering air fed to a reciprocating piston compressor of the commonly used "free air unloading" type with a liquid bath filter. When the compressor inlet valves are held open, this type of compressor will cease to pump air and causes a column of air to be sucked into, and to be pushed out of, each cylinder very rapidly as the compressor pistons continue to reciprocate. The outrush of air through the filter is sufficient to blow the liquid out of the filter unless the air pressure is quickly released. A commonly used portable compressor having two cylinders taking air from a common manifold, running at 1200 R. P. M. and delivering air at about 100 pounds per square inch will, therefore, cause air flow reversals at the rate of 2400 per minute. To the best of my knowledge, the most efficient prior valve devices consisted of flexible materials, supported at their center point. Unloading of the air compressor caused the air to rush outwardly through the flexible valve in such a manner that the entire valve outside of its center mounting was lifted slightly, and was followed by the folding upwardly of the valve edges. It was found through long experience that usually three folds occurred, namely along three lines which form a triangle.

After limited usage, the material of the valve became fatigued along these folds and would no longer provide an efficient seal during the normal air intake operation of the compressor. Another shortcoming of the flexible valves used prior to the present invention was found in the peripheral edge folding upwardly very abruptly out of the normal plane of the valve member, which resulted in a very sharp line of fold which had the effect of quickly wearing and permanently deforming or tearing the valve member along such sharp lines of fold. My invention provides a maximum valve opening with a minimum amount of stress and strain placed upon the valve member through the use of novel fold guide means.

Figure 1:
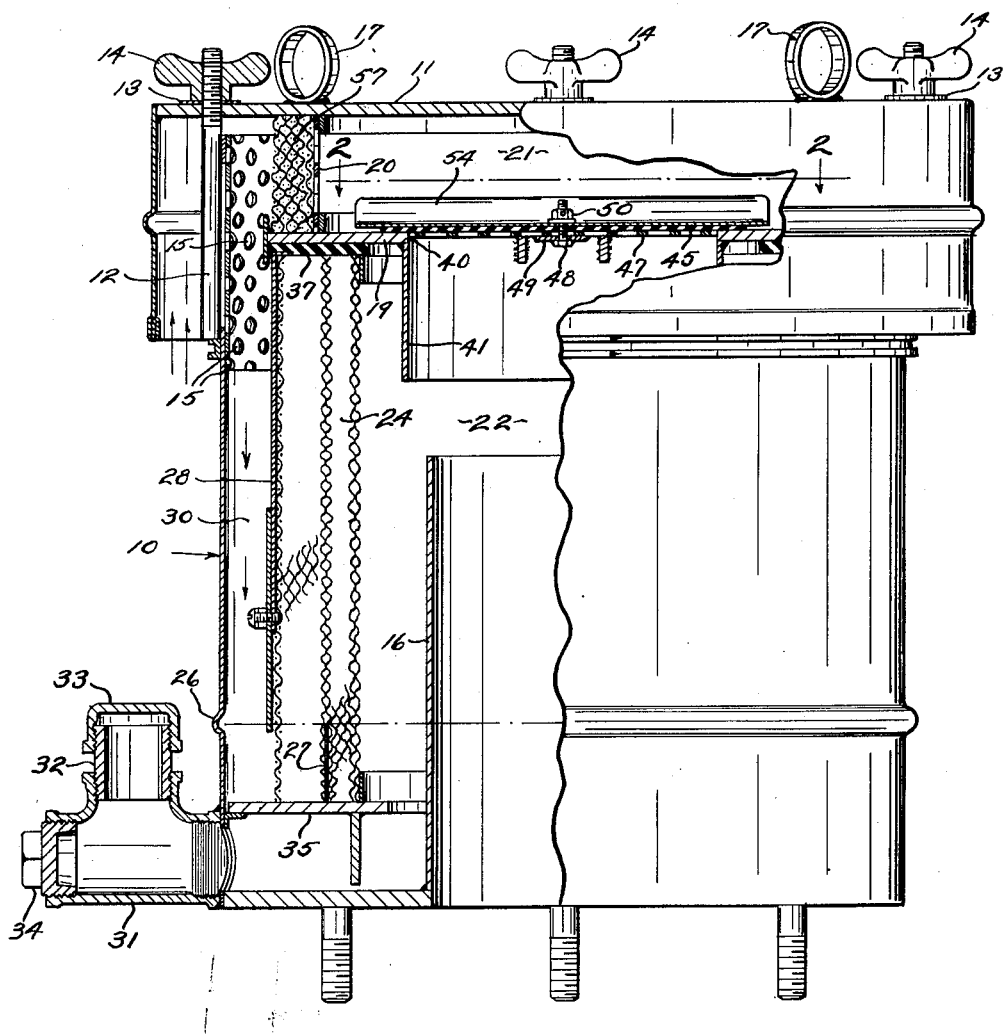
Fig. 1 is a side elevational view partly broken in central section showing a liquid-washed air filter in combination with my improved relief valve means.

The invention is shown as applied to a liquid bath filter as illustrated in Fig. 1 wherein an outer cup-shape housing 10 is provided with a top 11 secured thereto by means of a plurality of upstanding studs 12 permanently secured at their lower ends to the sides of the cup-shape housing 10 and retaining the top 11 by means of suitable washers 13 and wing nuts 14. A pair of crane hooks 17 are provided to facilitate lifting the filter when the parts are heavy. A multiplicity of air inlet openings 15 are provided in the side wall of the cup-shape housing 10 adjacent its upper end. Upstanding from the bottom wall of the cup-shape housing 10 is an outlet pipe 16 which fits on a suitable inlet (not shown) which leads to an air compressor. A partition 19 secured to the top 11 by perforated annular ring 20 is positioned between the upper end of outlet pipe 16 and the top 11 and thereby separates the filter into an upper chamber 21 and lower chamber 22.

Between the air inlet openings 15 and the outlet 16 I provide a filter element 24 which is of any known type, composed of foraminous material such as wire mesh screen or corrugated screen, or the filter element may be made of alternate flat and corrugated screen mesh material as taught in Patent No. 1,566,088 granted December 15, 1925 to Oscar Greene. The specific type of filter element constitutes no part of the present invention, except insofar as it provides a foraminous element adapted to be washed by a liquid, such as oil or the like, which fills the cup shape housing 10 up to the level of bead 26.

Radially outside of the screen filtering element 24 is a skirt 28 which hangs downwardly from the partition 19 to a level just slightly below bead 26. To provide a seal, a strip of air impervious material forming baffle 27 extends in a cylindrical form entirely around the filter element 24 and is provided near the bottom, between layers of the screen material, of the filter element. An outer annular inlet chamber 30 is defined between the cup-shape housing 10 and skirt 28, wherein, the air is moving downwardly. In the normal use of the filter, air entering the filter inlet opening 15 between the top cover 11 and cup shape housing 10, flows in the direction of the arrows down through the chamber 30, beneath the surface of the oil, carrying oil with it and upwardly against the face of the filter element 24, so as to keep the same continuously washed. The air passes above the baffle 27 and through the central portion of the filter into the interior of chamber 22, located below partition 19, to the upper end of outlet 16 and thence out of the filter by way of said outlet pipe 16.

For the purpose of supplying and maintaining the oil level within the filter reservoir, I provide a horizontal inlet pipe 31 adjacent the lower end of the cup-shape housing 10. The pipe 31 is provided with a vertically extending nipple 32 whose upper end is level with the bead 26. The correct oil level may be maintained by keeping the level of the oil near the top of the nipple 32. A cap 33 threadedly engages the nipple and prevents spilling or pollution of the oil contained therein. A plug 34 is provided at the outer end of pipe 31 for the purposes of draining the oil from the filter. For the purpose of supporting the lower end of the filter element 24, I provide a partition plate 35 secured to the inner surface of housing 10 a short distance above the bottom of said housing and having a space between its radially innermost edge and the outlet pipe 16, for communicating oil upwardly from the inlet pipe 31 to the level of bead 26 in housing 10.

It will be noted that the annular filter element 24 is supported at its lower end by the partition plate 35 and secured, in sealing engagement, at its upper end with partition 19 by means of a gasket 37. The partition 19 is provided with a central opening 40 for a purpose presently to be described, and a flange 41 which depends downwardly from the partition 19, around the opening 40, to prevent the washing liquid from being carried out of the opening 40, when the normal air stream flow is reversed.

It is obvious that in apparatus of this kind, upon the occurrence of a sudden pressure caused by the unloading of a compressor, reversal of fluid flow occurs, the fluid stream rushes upwardly through pipe 16 and if relief were not instantly provided, it would blow outwardly through the annular filter element 24 carrying oil upwardly through the passageway 30 and outwardly through the openings 15. The present invention obviates these difficulties in a novel manner.

I provide a flexible circular valve 45, across the opening 40 of partition 19, so designed and arranged that the rush of air upwardly through the pipe 16 is immediately relieved through the opening 40. The flexible valve 45 must be very carefully designed to provide the proper relief of fluid pressure, under all circumstances, before the oil can be carried out of the liquid filter. The valve opening must be of sufficient size that the velocity of the fluid escaping therethrough is of the order of five to six times the velocity of the flow through the filter element 24 when in normal use. The flexible valve 45 must be of sufficient thickness to provide durability, and it must also be of sufficient flexibility to permit the bending, as seen in Fig. 3, to provide instant relief of the reversed air pressure. It must also be of such material and so constructed as to close quietly. It should be remembered that when this device is used in connection with a multicylinder compressor, valve 45 must open and close with every piston stroke of the compressor. I find that for valves of the order of two to eight inches in outside diameter a thickness of $\frac{1}{16}$ inch is satisfactory and from nine to twenty-two inches in outside diameter a thickness of $\frac{1}{8}$ inch works well if the material has the characteristics of an oil resistant synthetic rubber substitute.

A valve constructed of sufficient flexibility to curl upwardly, as readily as herein required, must be supported across the opening 40 to prevent it from being drawn inwardly on suction strokes of the compressor. For this purpose, I have provided a supporting medium composed of coarse hardware mesh screen 47 extending across the opening 40, and having wires spaced three or four to the inch. The exact spacing of the supporting wires is immaterial, providing it gives an even support over the entire area and is sufficiently foraminous so as not to appreciably hold back the air flow. The edges of this screen are secured around the edges of the opening 40. The upper surface of partition 19 provides a level seat for the outer periphery of the valve 45. The center of the valve 45 has an aperture to receive the screw 48. Screw 48 extends upwardly through screen 47 and has its head portion provided with a washer 49. The screw passes through valve 45 which is secured thereto by nut 50, to hold the center of the valve attached to the screen 47.

For the purpose of preventing sharp lines of folds in the valve member 45 and for the purpose of defining the exact location of the lines of folds, I have provided a fold guide member 54 comprising a semi-circular tube or bar which extends diametrically across the center of valve member 45. The guide member 54 is maintained in contact with the upper surface of valve member 45 and held in place by screw 48 which extends through the bar substantially centrally of its length. The guide member contacts the valve surface over a relatively narrow area, as seen in Fig. 3. The surface of the guide member presented to the valve member is generally convex and may be semi-circular having a smooth round surface or it may be provided with an angular cross section (hexagonal, octagonal, etc.), of substantial gradually bending upwardly, as shown at 55 in Fig. 5. In Fig. 2, I have shown the guide member extending diametrically across the entire width of the valve member 45 and slightly beyond its outer periphery. However, the guide member may be modified to take the form 56 which is cut off within limits as will be hereafter described to terminate short of the peripheral edge of the valve member 45, as shown in Fig. 4.

A valve 45 constructed of the proper material, will operate approximately as shown in Fig. 3, by the dot-dash lines. The full lines of Fig. 3 indicate the closed position of the valve 45, which is the position of the valve when air is being drawn into the filter. When the air compressor is unloaded and air rushes outwardly through the valve 45, the edges of the flexible valve lying laterally to the sides of the guide member 54 fold upwardly in a manner as indicated by the dot-dash lines in Fig. 3. The portion of guide member 54 in contact with the surface of valve member 45 defines the line of fold along which the valve member must bend when subjected to reverse air flow. The lines of fold defined by the guide member 54 are substantially parallel to one another to prevent the triangular type fold, with its resulting stresses, as heretofore described. Furthermore the guide member is always of such length (if less than the full diameter of valve 45) to prevent any portion of the valve member located beyond the end of the guide bar (as at 56') from folding upwardly. It will be understood that the guide member need not extend across the entire diameter of the valve member 45, but may be cut off short of the peripheral edge of said valve member, as shown by member 56 in Fig. 4. The distance between the end of the guide member 56 and the peripheral edge of the valve member 45 will be determined to some degree by the stiffness of the material composing the valve member which resists folding of the unguided length 56' of said valve member beyond the end of the guide member 56, along a line transverse to the axis of the guide member. The stiffness of the valve member 45 is of course limited since the valve must be of sufficient flexibility to permit the edges thereof to fold up and quickly provide an opening large enough to accommodate the reversed air flow. The guide member serves an additional and valuable function by exposing a generally convex surface with respect to the valve member. The convex surface is of substantial radii, to guide the valve member along a smooth, gradual curvature of fold as indicated by the dot-dash positions of the valve 45, in Fig. 3, and thereby prevent sharp lines of fold as previously found in the operation of most relief valves.

Figure 5:
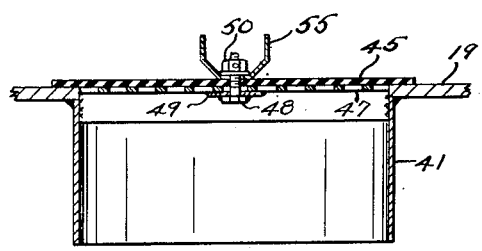
Fig. 5 is a view similar to that of Fig. 3, but showing a modified form of valve fold guide.

The guiding surface may be provided in various forms, and another embodiment thereof is shown in Fig. 5, as heretofore described.

Another feature which contributes to the success of the present invention is the placing of the upper end of outlet pipe 16 a short distance from the lower end of flange 41 so that the blast of air upwardly along pipe 16, when flow is reversed, is immediately effective, like a jet, to cause valve 45 to quickly open. Thus, I have provided a valve which does not fold along a sharp line but rather along a bend having a gentle curvature, that prevents fatigue and deformation of the valve material.

The air passing through valve 45 enters chamber 21 and then escapes through generous openings in the annular ring 20. An annular filter element 57 is provided about the outer surface of perforated ring 20 and supported at its bottom on partition 19 and at its upper end by the top 11. The filter element 57 is provided at this point because, while valve 26 is open, the compressor pistons are moving rapidly up and down, and on their suction stroke, draw in a certain amount of air through the openings of the ring 20. The filter element 57 is effective in cleaning this air, which is so drawn in. The air then escapes through opening 15 of cup-shape housing 10 and passes into the atmosphere.

In view of the foregoing description, taken in conjunction with the accompanying drawings, it is believed that a clear understanding of the construction, operation and advantages of the present device will be quite apparent to those skilled in this art.

It is to be understood, however, that even though there is herein shown and described a preferred embodiment of the invention, the same is susceptible to certain changes fully comprehended by the spirit of the invention.

What I claim is:

1. In a cleaner of the class described having an annular filter element, a central tubular fluid outlet positioned axially of said element, a housing forming an annular chamber about said element and forming a liquid bath receiving sump below said element, there being gaseous fluid inlet means on said housing above said sump, partition means for guiding the fluid from said element to said outlet including a wall opposite the end of said tubular outlet, and a planar outlet opening through said wall substantially axially aligned with said tubular outlet and substantially at right angles to the axis of said outlet, said outlet opening being substantially unobstructed; the combination therewith of a flexible flat circular valve closing said outlet opening, fold guide means presenting a smooth, generally convex semicircular surface of substantial radii to said valve member and holding that portion of said valve engaged by said fold guide means in approximately the plane of said opening leaving the periphery of said valve free, said guide means contacting said valve surfaces over a relatively narrow area, said guide means extending for such a distance across a diameter of said valve member that the stiffness of that unsupported length of said valve member when in open position beyond the ends of said guide means is sufficient to resist folding of said valve member downstream along a line transversely to the axis of said fold guide means, said valve being of a material of such flexibility that its peripheral portions lying laterally of said fold guide means are adapted to fold upwardly along parallel lines of fold by jet action of gaseous fluid in reverse flow through said tubular outlet, said fold defined by the surfaces of said guide means, said convex surfaces providing a smooth gradual fold in said valve, and stiff coarse hardware mesh screen fixed across the outlet opening substantially in the plane of said opening and on the side of said valve near said tubular outlet.

2. In a cleaner of the class described having an annular filter element, a central tubular fluid outlet positioned axially of said element, a housing forming an annular chamber about said element and forming a liquid bath receiving sump below said element, there being gaseous fluid inlet means on said housing above said sump, partition means for guiding the fluid from said element to said outlet including a wall opposite the end of said tubular outlet, and a planar outlet opening through said wall substantially axially aligned with said tubular outlet and substantially at right angles to the axis of said outlet, said outlet opening being substantially unobstructed; the combination therewith of a flexible flat circular valve closing said outlet opening, fold guide means presenting a generally convex surface to said valve member and holding that portion of said valve engaged by said fold guide means in approximately the plane of said opening leaving the periphery of said valve free, said guide means contacting said valve surface over a relatively narrow area, said guide means extending for such a distance across a diameter of said valve member that the stiffness of that unsupported length of said valve member when in open position beyond the ends of said guide means is sufficient to resist folding of said valve member downstream along a line transversely of the axis of said fold guide means, said valve being of material of such flexibility that its peripheral portions lying laterally of said fold guide means are adapted to fold upwardly along parallel lines of fold by jet action of gaseous fluid in reverse flow through said tubular outlet, said fold defined by the surfaces of said guide means, said convex surfaces providing a smooth gradual fold in said valve, said circular valve being of sufficient diameter to engage the inner surface of the top of said cleaner to prevent undue valve curling and fluttering, and stiff coarse hardware mesh screen fixed across the outlet opening substantially in the plane of said opening and on the side of said valve near said tubular outlet.

3. In a cleaner of the class described having an annular filter element, a central tubular fluid outlet positioned axially of said element, a housing forming an annular chamber about said element and forming a liquid bath receiving sump below said element, there being gaseous fluid inlet means on said housing above said sump, partition means for guiding the fluid from said element to said outlet including a wall opposite the end of said tubular outlet, and a planar outlet opening through said wall substantially axially aligned with said tubular outlet and substantially at right angles to the axis of said outlet, said outlet opening being substantially unobstructed; the combination therewith of a flexible flat circular valve closing said outlet opening, fold guide means presenting a generally convex surface to said valve member and holding that portion of said valve engaged by said fold guide means in approximately the plane of said opening leaving the periphery of said valve free, said guide means contacting said valve surface over a relatively narrow area, said guide means extending for such a distance across a diameter of said valve member that the stiffness of that unsupported length of said valve member when in open position beyond the ends of said guide means is sufficient to resist folding of said valve member downstream along a line transversely of the axis of said fold guide means, said valve being of material of such flexibility that its peripheral portions lying laterally of said fold guide means are adapted to fold upwardly along parallel lines of fold by jet action of gaseous fluid in reverse flow through said tubular outlet, said fold defined by the surfaces of said guide means, said convex surfaces providing a smooth gradual fold in said valve, and stiff coarse hardware mesh screen fixed across the outlet opening substantially in the plane of said opening and on the side of said valve near said tubular outlet.

References Cited in the file of this patent

UNITED STATES PATENTS

| | | |
|---|---|---|
| 1,867,478 | Stelzner | July 12, 1932 |
| 2,270,469 | Osborn, Jr. | Jan. 20, 1942 |
| 2,548,374 | Jonson | Apr. 10, 1951 |
| 2,644,663 | Klingler | July 7, 1953 |